(No Model.) 4 Sheets—Sheet 1.

N. H. BORGFELDT & A. C. SCHUTZ.
CIGAR BUNCHING MACHINE.

No. 331,676. Patented Dec. 1, 1885.

WITNESSES:
A. Schehl
John M. Speer.

INVENTORS:
Nicholas H. Borgfeldt
Adolph C. Schutz
BY Briesen & Steele
ATTORNEYS.

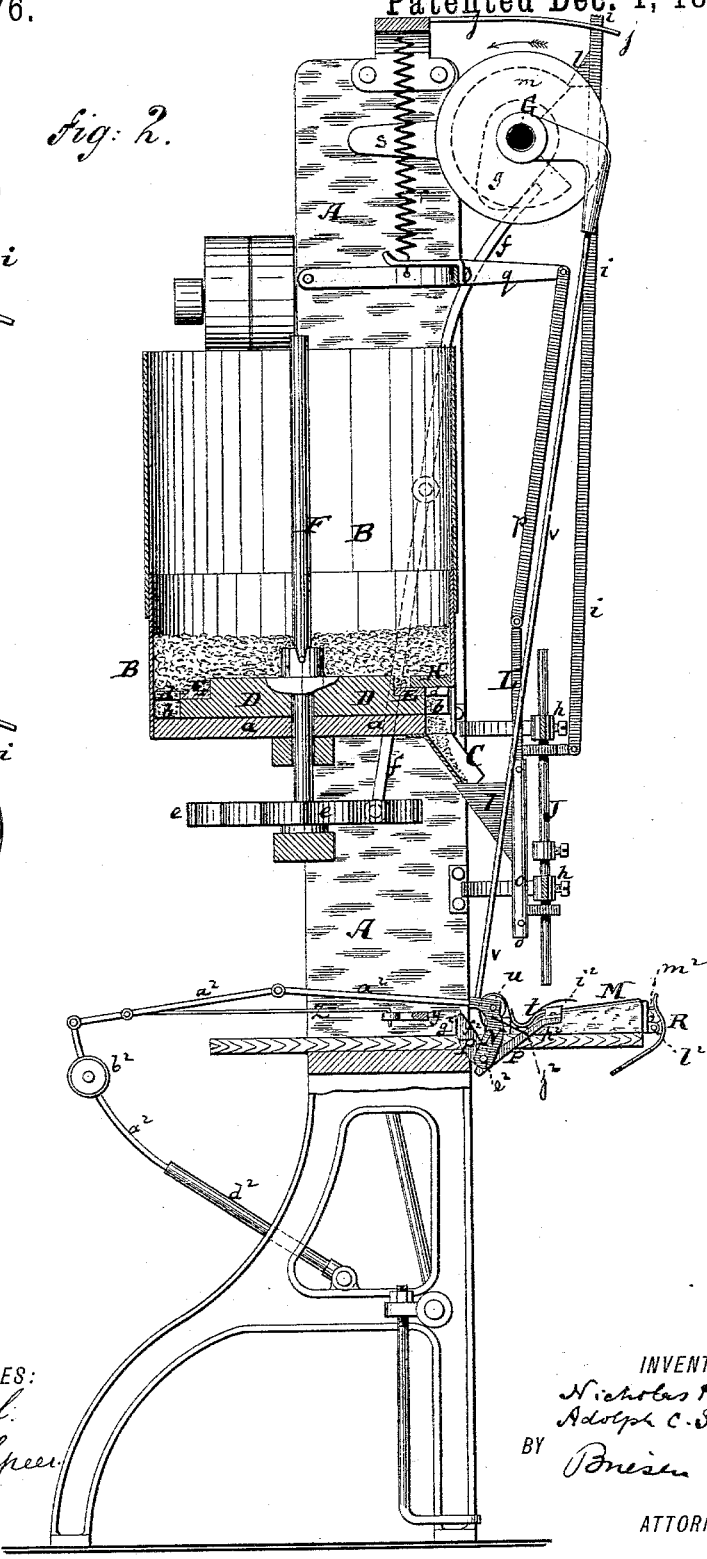
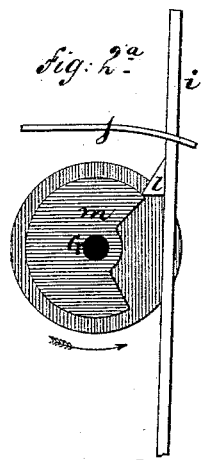
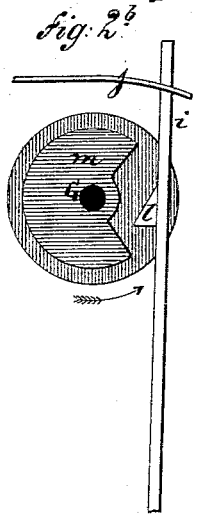

(No Model.) 4 Sheets—Sheet 3.

N. H. BORGFELDT & A. C. SCHUTZ.
CIGAR BUNCHING MACHINE.

No. 331,676. Patented Dec. 1, 1885.

WITNESSES:
A. Schehl.
John M. Speer.

INVENTORS:
Nicholas H. Borgfeldt
Adolph C. Schutz
BY Bresen & Steele
ATTORNEYS.

(No Model.) 4 Sheets—Sheet 4.

N. H. BORGFELDT & A. C. SCHUTZ.
CIGAR BUNCHING MACHINE.

No. 331,676. Patented Dec. 1, 1885.

WITNESSES:
A. Schehl.
John M. Speer.

INVENTORS:
Nicholas H. Borgfeldt
Adolph C. Schutz
BY Briesen & Steele
ATTORNEYS.

UNITED STATES PATENT OFFICE.

NICHOLAS H. BORGFELDT AND ADOLPH C. SCHUTZ, OF NEW YORK, N. Y.

CIGAR-BUNCHING MACHINE.

SPECIFICATION forming part of Letters Patent No. 331,676, dated December 1, 1885.

Application filed May 8, 1885. Serial No. 164,755. (No model.)

*To all whom it may concern:*

Be it known that we, NICHOLAS H. BORGFELDT and ADOLPH CHARLES SCHUTZ, both residents of New York city, in the county and State of New York, have jointly invented an Improved Cigar-Bunching Machine, of which the following is a full, clear, and exact description, reference being made to the accompanying drawings, in which—

Figure 1:
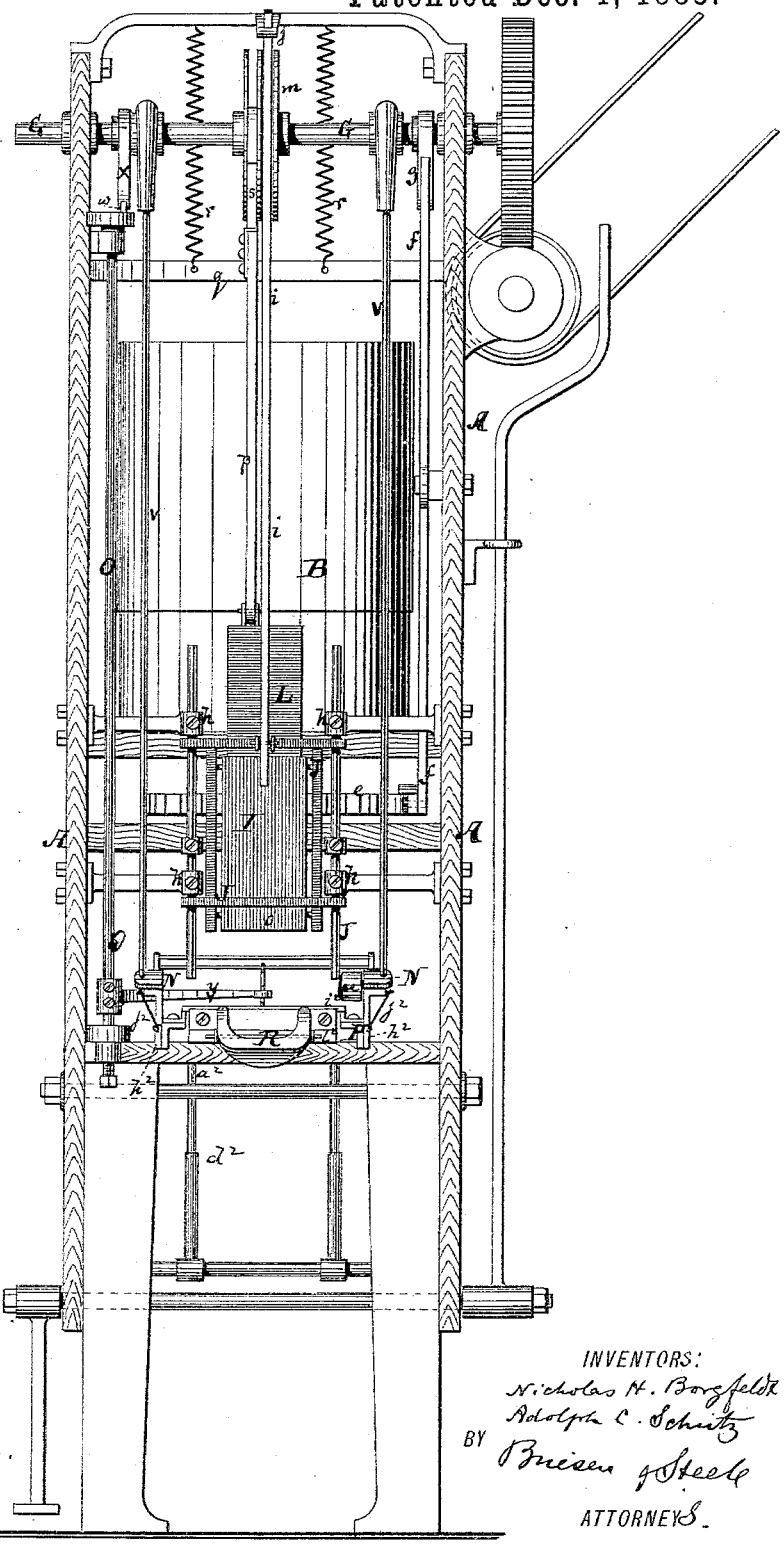
Figure 3:
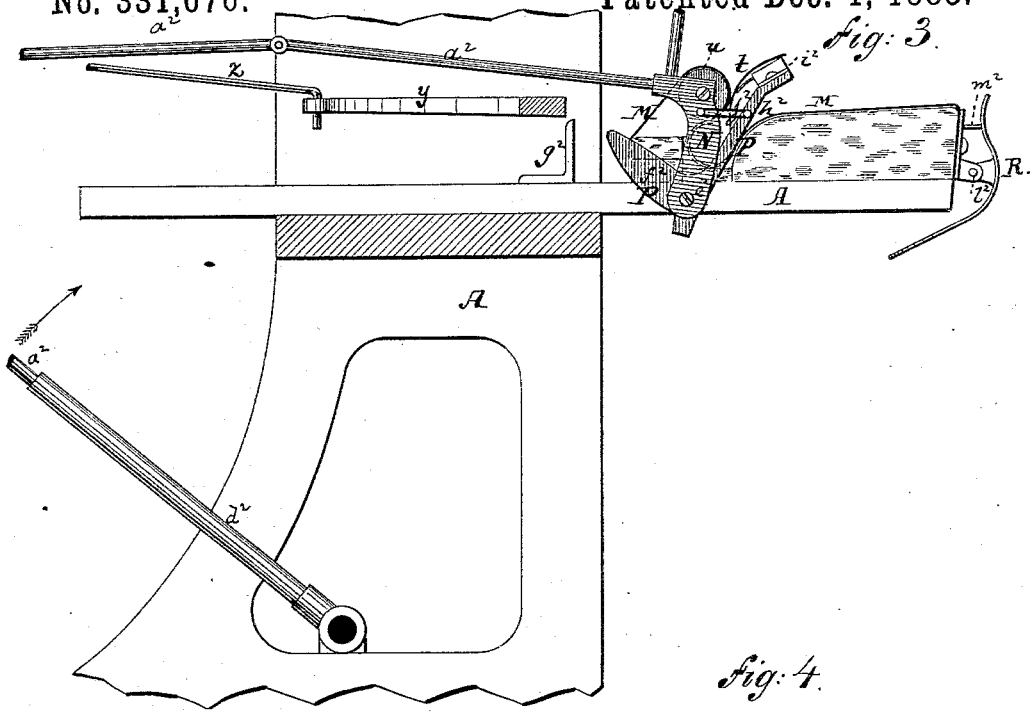
Figure 4:
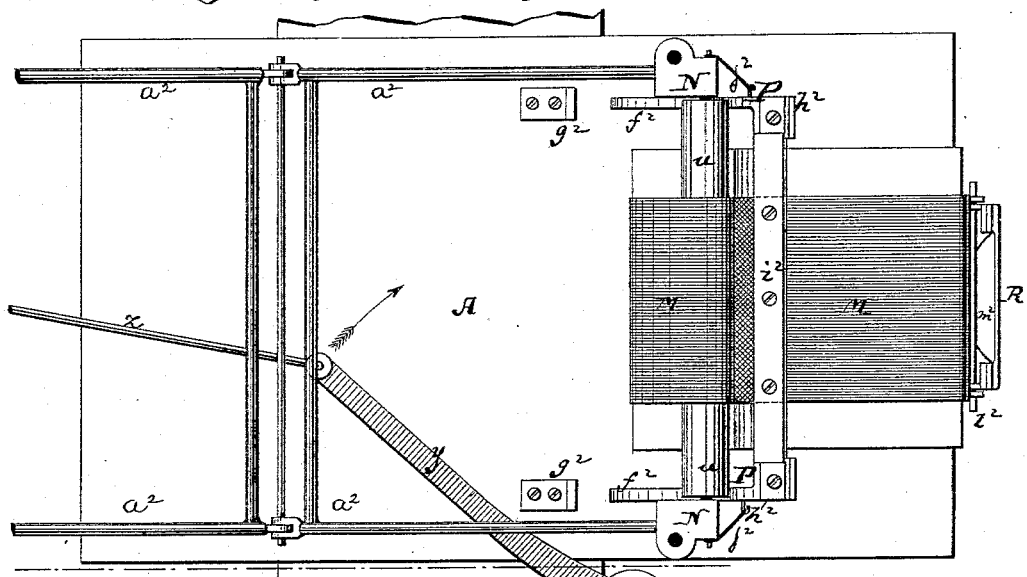
Figure 5:
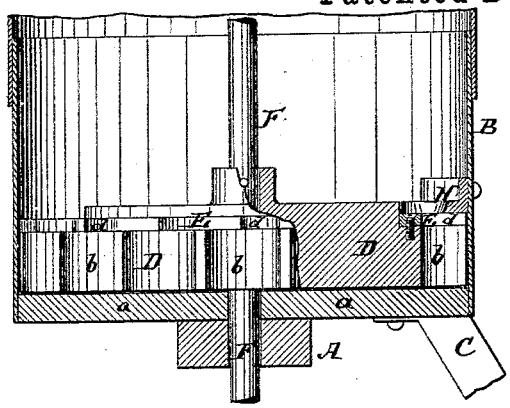
Figure 6:
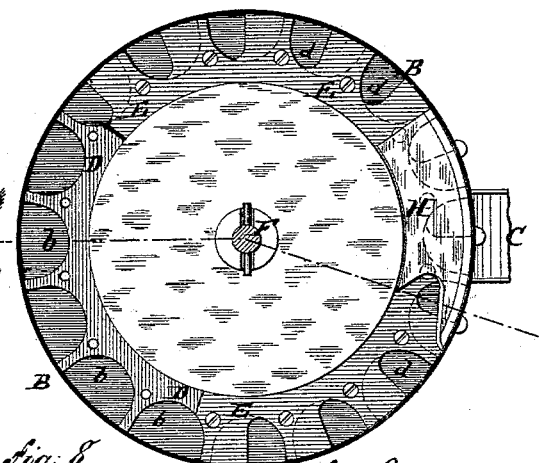

Figure 1 is a front elevation of our improved cigar-bunching machine. Fig. 2 is a vertical central section of the same. Figs. 2$^a$ and 2$^b$ are detail views of the cam mechanism for moving the reciprocating hopper. Fig. 3 is an enlarged side view of that portion of the machine which rolls the bunch. Fig. 4 is an enlarged top view of the same. Fig. 5 is an enlarged sectional view of the lower portion of the distributing-cylinder. Fig. 6 is a top view of the same. Figs. 7, 8, 9, and 10 are diagrams showing the several positions of the hopper and plunger during the operation of the machine.

This invention relates to a new bunching-machine—that is to say, one which will automatically produce the inner part or bunch of a cigar, which inner part consists of the filler and binder. The machine is adapted to produce such a bunch with a filler of scrap-tobacco, to measure the proper quantity of the scrap-tobacco for each bunch, to transport the same to the binder, to press the filler into the binder, and to then roll the binder around the filler, so as to complete the bunch, depositing the latter in condition for immediate and convenient use.

The invention consists, first, in the new mechanism which is connected with the distributing-cylinder for measuring out the proper quantities of scrap-tobacco needed in each bunch. In this part of the mechanism the drum contains two disks, one being notched at its circumference, each notch being the measure of the scrap-tobacco for a bunch, while the other superposed disk is perforated and partly covers the said notches in the lower disk. The two disks receive rotary motion, and are combined with a scraper, and finally serve to discharge the contents of the successive notches into a chute.

The second part of the invention consists of the combination of the said cylinder with a reciprocating hopper, which receives the scrap-tobacco from the said chute, and with a reciprocating plunger, which constitutes at the same time one wall of the hopper and the means for pressing the bunch into the binder, all as hereinafter more fully described.

The third main portion of our invention consists of the combination of a sliding and tilting binder-rest with a fixed apron, and with a roller, and with mechanism for moving said slide and roller, all operating in such manner that when the filler has been pressed into the binder the said sliding frame, roller, and apron will co-operate to roll the binder around the filler, and to deposit the completed bunch in the proper receptacle. From this receptacle the bunches are taken by the attendants, to be molded, and finally covered with proper wrappers in the ordinary manner of manufacturing cigars.

In the accompanying drawings, the letter A represents the frame of the machine, which frame supports an upright cylinder, B, the bottom $a$ of which cylinder is closed, except at one place, where it connects with an outwardly-projecting chute, C. On the bottom $a$ rests a disk, D, which at its circumference is notched, the notches being, by preference, of about semicircular form, as is indicated at $b\ b$ in Fig. 6; but these notches may be of other suitable form. The notches $b\ b$ in the circumference of the disk D are all of the same size and form, and are all equidistant from one another. Upon the upper face of the disk D is fastened another disk or annular plate, E, which is also notched at its edge, as shown in Fig. 6; but each notch $d$ of the disk E is smaller than each notch $b$ of the disk D, so that, as appears from the dotted lines beneath the plate E in Fig. 6, each of the notches $b$ is partly covered by the disk E, and partly uncovered, because of the notch $d$ above it.

We have stated that the disk E is notched, which statement implies that the notches extend to the circumference of the said disk; but it is not essential that this be the case, for perforations through the disk E which do not extend to its rim answer the same purpose—the purpose, namely, of feeding the scrap-tobacco into the lower larger notches, *b*; hence we have already spoken and will hereafter speak of the disk E as perforated.

The disks D and E are rigidly connected together by suitable screws or fastenings, and both are properly attached to a central upright shaft, F, to which intermittent rotary motion is imparted by suitable mechanism. The means which we have illustrated for the purpose of imparting such motion to said shaft, and thereby to the disks D E, is a ratchet-wheel, *e*, on the shaft F, which, by a pawl (not shown) and connecting-rod, *f*, is moved along at intervals by a projecting cam, *g*, on the main driving-shaft G of the machine; but any other means of imparting the desired motion to the shaft F may be employed. Vertically above that part of the bottom *a* of the cylinder B from which projects the chute C is secured to the inner wall of the cylinder B a plate, H, which we term "the scraper." This plate is directly above the disk E, and is of such extent that it will at least wholly cover a notch, *b*, and the notch *d* above the same, whenever these notches are aligned with the chute C.

The object of that part of the mechanism which we have so far described is to measure out the proper quantity of filler for each bunch. Each notch *b* constitutes such a measure. If the disk D, having the notches *b*, were alone in the cylinder, and the disk E dispensed with, the effect would be that the stationary scraper H might interfere with the upper stratum of the contents of each measure and prevent the fillers being measured out alike; but by placing the disk E, which has the smaller perforations or notches on top of the disk D, the tobacco reaches these several measures *b* through the perforations *d*, and will not be disturbed by the action of the scraper. The upper disk, E, is to be of such thickness that the tobacco contained in one of its own notches, *d*, added to the tobacco in the measure *b*, will be the quantity to constitute each bunch. If the bunch is to be larger, a thicker disk, E, is used; if smaller, a thinner; or the disk E can be raised or lowered on the disk D. The scraper H being in contact with the disk E, which has the smaller openings, *d*, will not materially affect the contents of these smaller openings, which it would do if the disk D, having the larger notches, *b*, were exposed to direct contact with it.

From what has been described it follows that as the shaft F receives intermittent rotary motion the cylinder B, containing a proper supply of scrap tobacco, the tobacco entering and filling the spaces *b d*, will be delivered in successive charges to and through the chute C, the respective charges being substantially alike, each charge being sufficient for a filler of a bunch.

Figure 7:
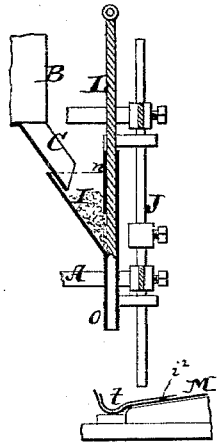
Figure 8:
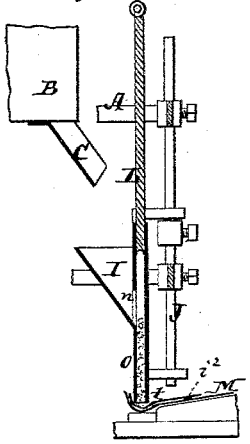
Figure 9:
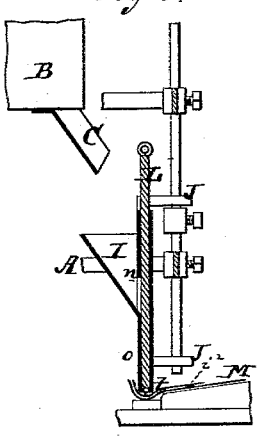
Figure 10:
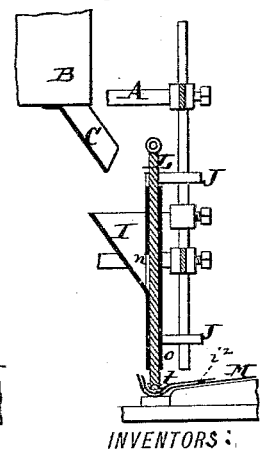

The chute C, whenever it discharges the tobacco it receives from the cylinder, enters, as is shown in Fig. 2 of the drawings, a hopper, I. This hopper is rigidly attached to a frame, J, which is capable of sliding vertically in proper bearings, *h*, that are attached to the frame-work A. The vertically-sliding frame J, carrying the hopper I, is connected with a rod, *i*, whose upper end is guided in a perforated plate, *j*, of the frame A, and which rod *i* carries a tooth, *l*, that is in contact with a notched cam, *m*, which is mounted upon the shaft G. (See Figs. $2^a$ and $2^b$.) Whenever this shaft G is revolved in the direction of the arrow shown in Fig. $2^a$, it will serve, starting from the position represented in Fig. $2^a$, first to let the frame J and its hopper drop down, and afterward to lift it up again, all of which will be clearly understood from an examination of Figs $2^a$ and $2^b$; but other means for reciprocating the frame J and hopper I may be substituted in lieu of those herein specifically shown. The back wall, *n*, of the hopper I is perforated or open, as appears more clearly from Fig. 7, and at the time the chute C discharges the scrap-tobacco into the hopper this perforation is closed by a board, L, as in Fig. 7. Beneath the board the hopper has a downwardly-extending tube, which is open at both ends, and which is marked with the letter *o*. When the parts are in the position represented in Fig. 7, the board L serves to close the opening in the back wall, *n*, of the hopper, and also to close the top of the tube *o*. The board L, which hereinafter we will call the "plunger," for it serves as such, is suspended by a rod, *p*, from a lever, *q*, which lever is normally held in the raised position shown in Fig. 2, by a spring, *r*, but which at proper intervals is depressed by a toe, *s*, that projects from the rotary shaft G. Thus reciprocating motion is imparted to the plunger L; but other means than those specifically described may be substituted for imparting such reciprocating motion to said plunger. Directly beneath the downwardly-extending tube *o* of the hopper I is the rest or place of deposit for the binder *t*, which we will hereinafter more fully describe. Fig. 7 shows this binder in position for receiving the charge of the filler.

The mechanism now described—that is to say, the hopper and plunger—operates as follows: When the chute C discharges the scrap tobacco into the hopper, the outlet from the latter is closed by the plunger, as in Fig. 7, both the plunger and hopper being in their highest position. After the charge of scrap-tobacco has been thus received by the hopper the latter is suddenly dropped downward into the position shown in Fig. 8—that is, into a position where it will nearly if not quite touch the binder. It will be seen that in this position, the plunger L not having been disturbed, the opening in the back wall, *n*, of the hopper is no longer closed, and that the charge of tobacco is now contained in the tube *o*, that extends downwardly from said hopper. While the hopper remains in this position the plunger L descends and presses the charge of scrap-tobacco into or upon the binder, (see Fig. 9,) emptying the tube $o$ of the hopper in so doing. While the plunger is in this lowermost position, the hopper slowly begins to ascend, (see Fig. 10,) and after that the plunger reascends until both parts I and L again attain the position shown in Fig. 7, ready to receive a new charge of scrap-tobacco from the cylinder B. Thus we succeed in transferring each charge of scrap-tobacco to a binder, and in, so to say, condensing or compressing such charge into such binder, giving the charge a convenient form for afterward rolling into a bunch. In order to render this formation of the charge in or on the binder the more perfect, we hollow out the lower end of the plunger, as is clearly shown in Figs. 7, 8, 9, and 10, so that it will, in a measure, keep the charge in its grasp and press it into a rounded shape.

We will now proceed to describe the "binder-rest," as we have termed it. This is composed, in the first instance, of an apron, M, which is securely fastened at both ends to the frame A, but so as to bag, and not stretched tightly. When the binder $t$ is placed upon this apron, it is also bagged down, as in Fig. 2, directly beneath the tube $o$ of the hopper I. The apron M passes over a roller, $u$, which is hung in a horizontally-sliding frame, N. Perhaps this term "horizontally-sliding frame" N is not absolutely correct, because the said frame N is connected by upright elbow-rods $v$ with the shaft G or other pivot, the hubs of said elbow-rods embracing the shaft or other pivot loosely, so that when the frame N moves it actually moves around the shaft G as its center. Reciprocating motion is imparted to the frame N from the shaft G by an upright arbor, O, (see Fig. 1,) which carries a crank-pin, $w$, that is struck by a crank, $x$, on the shaft G, at certain intervals. This arbor carries at its lower portion a projecting arm, $y$, (see Figs. 1 and 4,) said arm being shown in its normal position in Fig. 4. The end of the arm $y$ connects by a link, $z$, with a series of rods, $a^2$, of which one is by preference weighted, as shown at $b^2$, said rods connecting the frame N with a pivoted hollow guide, $d^2$. Whenever the arm $y$ is moved in the direction of the arrow, which is shown in Fig. 4, it pushes the rods $a^2$ toward the frame N and moves the latter in the same direction. Whenever the pin $w$ is relieved from contact with the crank $x$, the weight $b^2$ pulls the frame N back into the normal position in which it is represented in Fig. 2.

To the lower part of the frame N is pivoted at $e^2$ a V-shaped frame, P, which in the normal position of the parts has one of its arms, $f^2$, resting against a stationary bracket, $g^2$. The other longer arm, $h^2$, of the frame P is connected with a cross-bar, $i^2$, (see Fig. 4,) which extends over the apron M. While the parts are in the position shown in Fig. 2, the binder $t$ receives the charge of scrap-tobacco in its bag portion, which bag portion is right close to the roller $u$.

After the charge has been deposited in the binder the frame N is moved outward by the connections already described. The first effect of this outward motion is to cause the springs $j^2$, which connect the long arm $h^2$ of the frame P with the main frame $N^2$, to draw said long arm upward, as in Fig. 3, so as to carry the outer flat part of the binder against that portion of the apron M which embraces the roller $u$, thereby almost wholly inclosing the filler in one end of the binder. Fig. 3 shows clearly the effect which the spring $j^2$ has had upon the position of the frame P, since the latter was released from contact with the bracket $g^2$. As the frame N, when in the position shown in Fig. 3, is moved outwardly still farther, it will be readily seen that the effect is to roll the entire binder around the filler; for the roller $u$, traveling along in the upper coil of the S part of the apron, will cause the said apron by its frictional contact with the binder to carry the rounded end of the binder along in the same direction in which said apron is moved, and thus complete the bunch, which, when completed, rolls over the outer end of the apron into what heretofore we have termed the "receptacle," R. This receptacle need be nothing but a weighted lever pivoted at $l^2$, and having a rest, $m^2$, for the bunch to fall upon, the lever R being pivoted in order to allow it to yield to a larger bunch, if necessary. When the bunch has been thus placed on the rest $m^2$, the frame N recedes until it resumes the position shown in Fig. 2, and the operation already described is repeated. The operator takes the bunch from the rest $m^2$ and places it in a proper mold, after which it is provided with a wrapper, or otherwise manipulates the same in suitable manner.

We claim—

1. The cylinder B, having bottom $a$, and chute C, combined with the rotary disk D, having notches $b$, upper disk, E, having apertures $d$, and scraper H, for operation substantially as herein shown and described.

2. The combination of the measuring-disk D, having the larger notches, $b$, with the upper disk, E, having smaller notches or apertures, $d$, part of each notch $b$ being covered by the disk E, as specified.

3. The cylinder B, having discharge-chute C, combined with the reciprocating hopper I and reciprocating plunger L, as specified.

4. The combination of the cylinder B, rotary notched disk D, stationary scraper H, and chute C with the hopper I, having perforated wall $n$, plunger L, and mechanism, substantially as described, for first lowering said hopper, then said plunger, then raising said hopper, and then said plunger, as and for the purpose specified.

5. The binder-rest apron M, combined with the sliding frame N, having roller $u$, tilting frame P, and spring $j^2$, substantially as herein shown and described.

6. The combination of the apron M with the frame N, having roller $u$, pivoted frame P, having cross-bar $i^2$, spring $j^2$, and stationary bracket $g^2$, substantially as described.

7. The combination of the sliding frame N, which has the roller $u$, with the apron M, tilting frame P, and pivoted elbow-rods $v$, as specified.

8. The combination of the vibrating arm $y$, link $z$, rods $a^2$, and guide tube $d^2$ with the sliding frame N, roller $u$, apron M, pivoted frame P, spring $j^2$, and bracket $g^2$, substantially as described.

9. In a bunch-machine, the combination of the cylinder B, having notched disk D, and chute C, with the reciprocating hopper I, reciprocating plunger L, apron M, sliding frame N, having roller $u$, and bunch-receiver R, substantially as specified.

NICHOLAS H. BORGFELDT.
ADOLPH C. SCHUTZ.

Witnesses:
HARRY M. TURK,
GUSTAV SCHNEPPÉ.